(12) United States Patent
Cho et al.

(10) Patent No.: US 7,152,088 B2
(45) Date of Patent: Dec. 19, 2006

(54) SQRT CALCULATOR CAPABLE OF REDUCING ERROR

(75) Inventors: Bong-hwan Cho, Gyunggi-do (KR); Bong-soon Kang, Busan (KR); Bong-guen Lee, Busan (KR); Young-sun Kim, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 729 days.

(21) Appl. No.: 10/359,539

(22) Filed: Feb. 7, 2003

(65) Prior Publication Data

US 2003/0167290 A1 Sep. 4, 2003

(30) Foreign Application Priority Data

Feb. 9, 2002 (KR) ................. 2002-7753

(51) Int. Cl.
 *G06F 7/38* (2006.01)
(52) U.S. Cl. ..................................... 708/605
(58) Field of Classification Search ................ 708/500, 708/605

See application file for complete search history.

(56) References Cited

U.S. PATENT DOCUMENTS

| | | | | |
|---|---|---|---|---|
| 5,537,345 A | * | 7/1996 | Nakano ........................ | 708/605 |
| 5,956,263 A | * | 9/1999 | Narita et al. ................. | 708/605 |
| 6,115,733 A | * | 9/2000 | Oberman et al. ............ | 708/654 |

* cited by examiner

*Primary Examiner*—Chuong D. Ngo
(74) *Attorney, Agent, or Firm*—Sughrue Mion, PLLC

(57) ABSTRACT

A SQRT calculator capable of calculation with a minimal error is provided. The integer calculation unit selects a largest integer from a set of integers with a square of each of the integers smaller than an input datum. The transformation unit transforms the selected integer from the integer calculation unit by multiplying it by 2 and shifts a decimal point of the resulting number to the right by 1 place, thereby adding a certain number less than 10 to the decimal point shifted number to calculate a transformation value. The calculation unit shifts a decimal point of the number less than 10 to the left by 2 places and multiplies the transformation value by the resulting value, thereby subtracting the multiplied value from the input datum and choosing a largest number less than 10 with the subtracted value being in a desired range as a second decimal number of the square root. Thus, the SQRT calculator is capable of calculation with minimal error and, furthermore, has a minimum size of hardware.

6 Claims, 6 Drawing Sheets

SQRT CALCULATOR CAPABLE OF REDUCING ERROR

BACKGROUND OF THE INVENTION

1. Field of the Invention

The present invention relates to a SQRT (Square Root) calculator, and more particularly to a SQRT calculator capable of reducing an amount of calculation and having a simple hardware structure.

The present application is based on Korean Patent Application No. 2002-7753, which is incorporated herein by reference.

2. Background of the Related Art

FIG. 1 is a schematic diagram showing a hardware construction of a conventional seed-type SQRT calculator. The SQRT calculator 10 comprises a selection signal output unit 11, a slope storage unit 13, a y-intercept storage unit 15, a multiplier 17 and an adder 19.

The selection signal output unit 11 transmits a slope selection signal and a y-intercept selection signal to the slope storage unit 13 and the y-intercept storage unit 15 to select a slope and a y-intercept, respectively, necessary for calculation of a square root with respect to an input datum. The selection signal output unit 11 also transmits the input datum to the multiplier 17.

The slope storage unit 13 stores the slope necessary for calculation of the square root. On receiving the slope selection signal from the selection signal output unit 11, the slope storage unit 13 transmits the slope corresponding to the received selection signal to the multiplier 17.

The y-intercept storage unit 15 stores the y-intercept necessary for calculation of the square root. On receiving the y-intercept selection signal from the selection signal output unit 11, the y-intercept storage unit 15 transmits the y-intercept corresponding to the received selection signal to the adder 19.

The multiplier 17 multiplies the slope from the slope storage unit 13 by the received datum from the selection signal output unit 11, to transmit the resulting value to the adder 19. The adder 19, then, adds the received values from the y-intercept unit 15 and multiplier 17. The following equation represents above described arithmetic relations.

$$\text{output datum} = \text{slope} \times \text{input datum} + y\text{-intercept} \qquad \text{[Equation 1]}$$

Generally, the SQRT calculator in FIG. 1 uses an approximation method by representing preliminary calculation results as a graph, as shown in FIG. 2, and diving the graph into linearized sub-regions. As shown in FIG. 2, respective square roots are calculated to be represented as a graph and these values are divided into 7 sub-regions to be linearized.

This method forms 7 fractional lines represented by 7 linear equations, respectively. Thus, 7 slopes and y-intercepts, respectively, are needed to calculate a square root of an input number. The sub-regions can be set as needed. If those sub-regions are more than 7, then each of a slope and a y-intercept with respect to each sub-region is needed.

FIG. 3 is a flow chart illustrating the step of calculating a square root by the SQRT calculator in FIG. 1. As shown in FIG. 3, the selection signal output unit 11 generates an address corresponding to each of the sub-regions set as described above (S301). The slope storage unit 13 and y-intercept storage unit 15 store a slope and a y-intercept, respectively, corresponding to each of the sub-regions. The selection signal output unit 11 transmits a selection signal to the slope storage unit 13 and y-intercept storage unit 15 to select the slope and y-intercept corresponding to the generated address. The selection signal output unit 11 also transmits an input datum to the multiplier 17. The slope storage unit 13 outputs the slope corresponding to the selection signal from the selection signal output unit 11 to the multiplier 17. The y-intercept storage unit 15 transmits the y-intercept corresponding to the received selection signal from the selection signal output unit 11 to the adder 19 (S303). The multiplier 17 multiplies the received input datum by the y-intercept to output the resulting value to the adder 19. The adder 19 adds the value from the multiplier 17 and the y-intercept from the y-intercept storage unit 15 (S305). The adder 19 outputs the resulting value which is calculated as above Equation 1 (S307). This terminates the calculation of the square root by the SQRT calculator.

Besides the above described method, a Newton-Raphson algorithm is used to calculate a square root. The Newton-Raphson algorithm is based on a following Equation 2.

$$Y_{k+1} = Y_k - \frac{Y_k^2 - X}{2Y_k} = \frac{1}{2}\left(Y_k + \frac{X}{Y_k}\right) \qquad \text{[Equation 2]}$$

$$Y_{k+1} = Y_k - \frac{f(Y_k)}{f'(Y_k)}$$

$$f(Y) = Y^2 - X$$

In the Newton-Raphson algorithm, the more iteration performed, the more accurate the calculation result. For a calculation of a square root of 0.7, for example, 3 times iteration is needed for an accurate result, as shown in Table 1. Here, X is 0.7 and Y is 0.5.

TABLE 1

| K  | 0  | 1    | 2      | 3      | 4      |
|----|----|------|--------|--------|--------|
| Yk | 05 | 0.95 | 0.8434 | 0.8367 | 0.8367 |

Comparing the above-described two methods, it can be noticed that the method using the seed-type SQRT calculator is more convenient to obtain a result than the method using the Newton-Raphson algorithm.

However, the conventional SQRT calculator is subject to an error due to its seed-type structure as shown in FIG. 4. With 7 seeds and an input datum, a number between 1 and 105, it can be noticed in FIG. 5 that an error, which is a difference between a true square root and a square root calculated by the seed-type SQRT calculator, of maximum 6 is caused. It can also be noticed that errors for boundary points of each sub-regions are 0, but errors for inner points of each sub-regions, which are far from the boundaries, i.e. an arrowed point as shown in FIG. 4, become much larger.

To minimize these errors, the conventional SQRT calculator needs to reduce the intervals of its sub-regions, thereby causing the number of coefficients to be stored to increase. When parallel processing is adopted to calculate a square root in accordance with each of the divided sub-regions by the conventional SQRT calculator, calculation speed increases, but the volume of the hardware increases since separate units such as multipliers and adders are needed for processing calculation of each of the sub-regions.

The method using the Newton-Raphson algorithm, on the other hand, has a disadvantage in that a number of iterations of calculation are needed to obtain an accuracy and the volume of the hardware increases since additional divider and differentiator besides multiplier are needed on implementation.

SUMMARY OF THE INVENTION

An object of the invention is to solve at least the above problems and/or disadvantages and to provide at least the advantages described hereinafter.

Accordingly, one object of the present invention is to provide a SQRT calculator capable of minimizing an error and a size of hardware thereof.

The foregoing and other objects and advantages are realized by providing a SQRT calculator for calculating a square root of an input datum comprising: an integer calculation means for selecting a largest integer from a set of integers with a square of each of the integers smaller than the input datum; a transformation means for adding an nth (n being an integer) transformation value of a certain number less than 10 and an nth lowest place value to shift a decimal point of the added number to the right by 1 place, thereby adding an (n+1)th lowest place value of a certain number less than 10, to the decimal point shifted number to calculate an (n+1)th transformation value; and a calculation means for shifting a decimal point of the nth lowest place value to the left by 2n places to multiply the shifted value by the nth transformation value, thereby choosing a largest number from a set of nth lowest place values such that each of the resulting values according to the multiplication becomes smaller than or equal to an nth calculation value, as an (n+1)th decimal place number of the square root and a subtraction of the resulting value of the multiplication from the nth calculation value as an (n+1)th calculation value, wherein the transformation means transforms the selected integer from the integer calculation means by multiplying it by 2 to shift a decimal point of the resulting number to the right by 1 place, thereby adding the first lowest place value as n equal to 1 to the decimal point shifted number to calculate the first transformation value. The calculation means shifts a decimal point of the first lowest place value to the left by 2 places to multiply the first transformation value by the decimal point shifted value, thereby subtracting the resulting value from the input datum to calculate the first calculation value as n equal to 1.

According to the SQRT calculator, n is increased by 1 when an nth decimal place number of the square root is calculated.

According to the SQRT calculator, the nth decimal place number of the square root is rounded off when n reaches a predetermined number.

According to another aspect of the invention, a SQRT calculator for calculating a square root of an input datum of a binary number comprises an integer calculation means for selecting the largest binary integer from a set of binary integers with a square of each of the binary integers smaller than the input binary datum; a transformation means for adding an nth (n being a denary integer) transformation value of a certain number less than $10_{(2)}$ and an nth lowest place value to shift a decimal point of the added number to the right by 1 place, thereby adding an (n+1)th lowest place value of a certain number less than $10_{(2)}$ to the decimal point shifted number, to calculate an (n+1)th transformation value; and a calculation means for shifting a decimal point of the nth lowest place value to the left by 2n places to multiply the shifted value by the nth transformation value, thereby choosing a largest number from a set of nth lowest place values such that each of the resulting values according to the multiplication becomes smaller or equal to an nth calculation value, as an (n+1)th decimal place number of the square root and a subtraction of the resulting value of the multiplication from the nth calculation value as an (n+1)th calculation value, wherein the transformation means transforms the selected binary integer from the integer calculation means by multiplying it by $10_{(2)}$, to shift a decimal point of the resulting number to the right by 1 place, thereby adding the first lowest place value as n equal to 1 to the decimal point shifted number to calculate the first transformation value. The calculation means shifts a decimal point of the first lowest place value to the left by 2 places to multiply the first transformation value by the decimal point shifted value, thereby subtracting the resulting value from the input binary datum to calculate the first calculation value as n equal to 1.

According to the present invention, the SQRT calculator capable of accurate calculation as well as having a minimum size of hardware is provided.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a SQRT calculator capable of reducing an amount of calculation and having a simple hardware structure according to a preferred embodiment of the invention in reference to the accompanying drawings.

Figure 1:
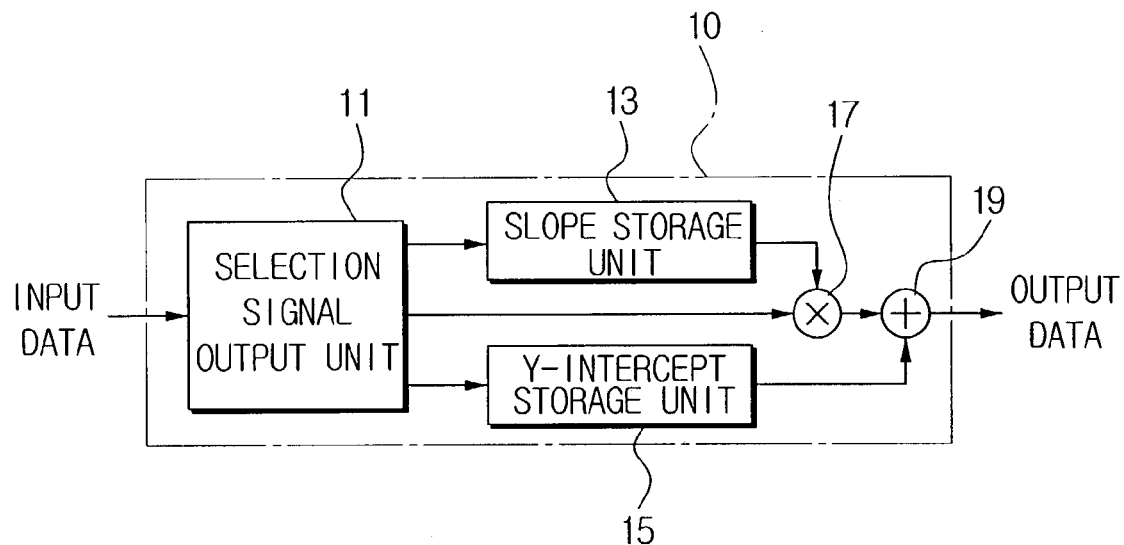
FIG. 1 is a schematic diagram showing a hardware construction of a conventional seed-type SQRT calculator.
Figure 2:
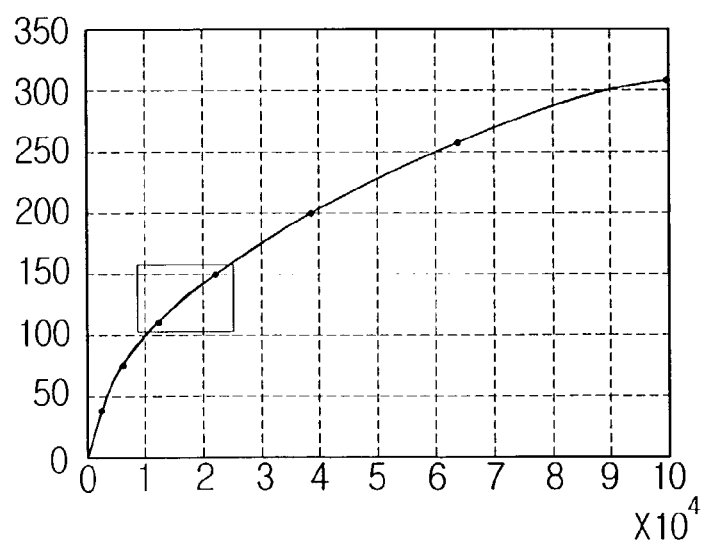
FIG. 2 is a view to illustrate a method for calculating a square root by the calculator in FIG. 1.
Figure 3:
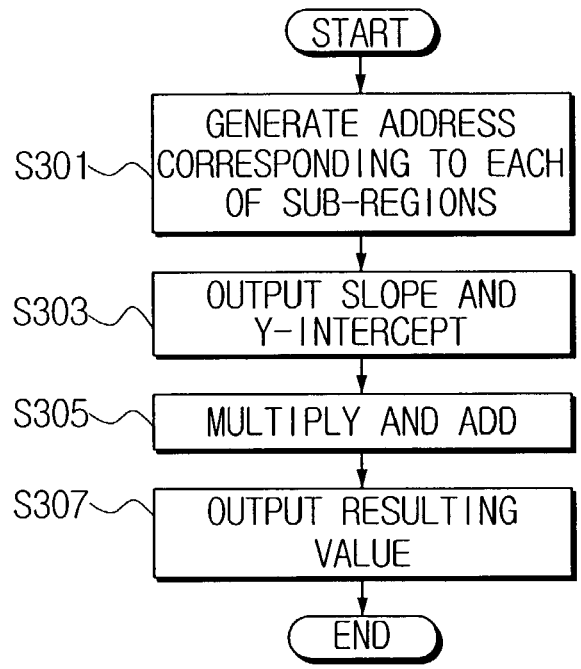
FIG. 3 is a flow chart illustrating the step of calculating a square root by the calculator in FIG. 1.
Figure 4:
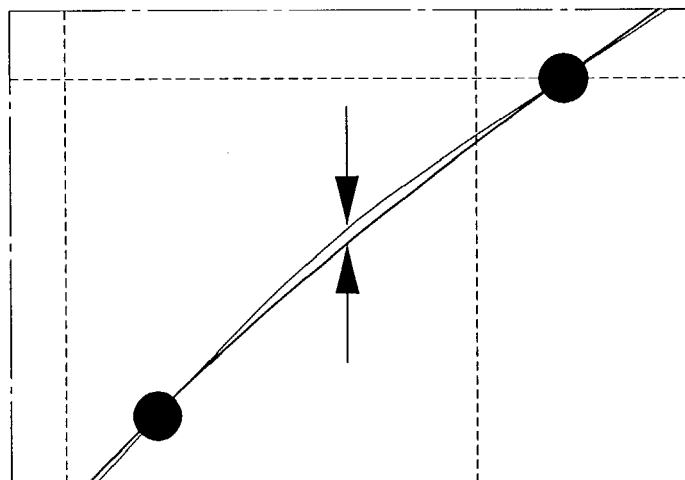
FIG. 4 is a view to show an error caused by the SQRT calculator in FIG. 1.
Figure 5:
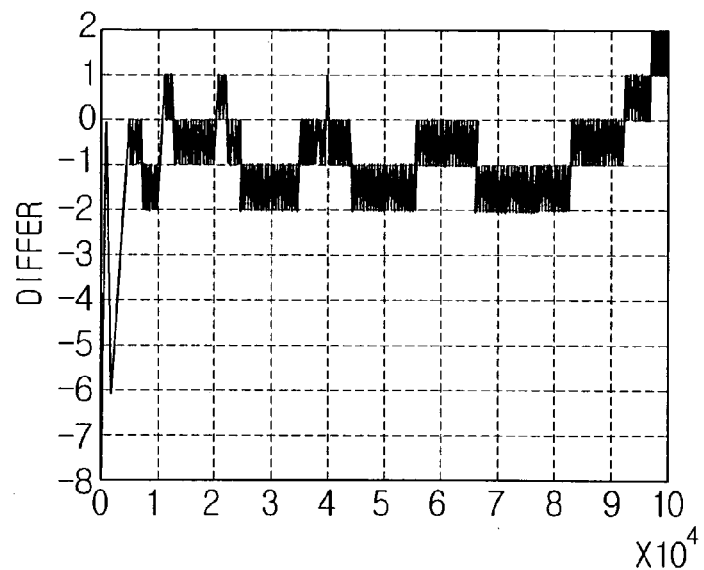
FIG. 5 is a graph showing differences between exact square roots and square roots by rounding off values calculated by using the seed method in FIG. 2 with respect to values from 1 to 105.
Figure 6:
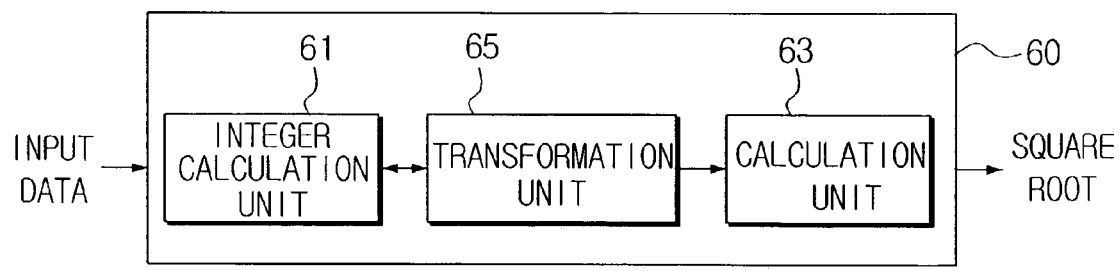
FIG. 6 is a schematic diagram showing a SQRT calculator in accordance with the present invention.

FIG. 6 is a schematic diagram showing a SQRT calculator in accordance with the present invention. The SQRT calculator 60 comprises an integer calculation unit 61, a transformation unit 65 and a calculation unit 63.

The integer calculation unit 61 selects a largest integer from a set of integers such that a square of each of the integers is smaller than an input datum, or number. When a binary number is inputted for a calculation of its binary square root, the integer calculation unit 61 selects a largest binary integer from a set of binary integers such that a square of each of the binary integers is smaller than the input binary number.

The transformation unit 65 transforms the selected integer to calculate the square root of the input number. The calculation unit 63 calculates the square root using the transformed value by the transformation unit 65 and the input number.

The operations of the transformation unit 65 and calculation unit 63 will hereinafter be described in detail. The transformation unit 65 transforms the selected integer from the integer calculation unit 61 by multiplying it by 2 and shifting a decimal point of the resulting number to the right by 1 place, which means here the number is multiplied by 10. The transformation unit 65 adds a certain number less than 10, which is a first lowest place value, to the decimal point shifted number and the resulting number becomes a first transformation value.

The calculation unit 63 subtracts the square of the integer selected by the integer selection unit 61, from the input number to calculate a first calculation value. The calculation unit 63 shifts a decimal point of the first lowest place value to the left by 2 places, which means here the number is divided by 100, and multiplies the first transformation value by the resulting value. The calculation unit 63 chooses a largest number from a set of first lowest place values such that each of resulting values according to above multiplication becomes smaller or equal to the first calculation value, as a first decimal place number of the square root.

The transformation unit 65, on the other hand, adds the first transformation value and the first lowest place value and shifts a decimal point of the added number to the right by 1 place, which means the number is multiplied by 10. The transformation unit 65 adds a certain number less than 10, which is a second lowest place value, to the decimal point shifted number and the resulting number becomes a second transformation value.

The calculation unit 63 subtracts the multiplication of the decimal point shifted (to the left by 2 places), first lowest place value and first transformation value from the first calculation value to calculate a second calculation value. The calculation unit 63 shifts a decimal point of the second lowest place value to the left by 4 places, which means here the number is divided by $10^4$ and multiplies the second transformation value by the resulting value. The calculation unit 63 chooses a largest number from a set of second lowest place values such that each of resulting values according to above multiplication becomes smaller or equal to the second calculation value, as a second decimal place number of the square root.

As described above, the transformation unit 65 adds an nth transformation value and an nth lowest place value, and shifts a decimal point of the added number to the right by 1 place, which means here the number is multiplied by 10. The transformation unit 65 adds a certain number less than 10, which is an (n+1)th lowest place value, to the decimal point shifted number and the resulting number becomes an (n+1)th transformation value (here, n=2, 3, 4 . . . ).

The calculation unit 63 shifts a decimal point of the nth lowest place value to the left by 2n places and subtracts the multiplication of the resulting value and nth transformation value from an nth calculation value, to calculate an (n+1)th calculation value. The calculation unit 63 shifts a decimal point of the (n+1)th lowest place value to the left by 2(n+1) places and multiplies the (n+1)th transformation value by the resulting value. The calculation unit 63 chooses a largest number from a set of (n+1)th lowest place values such that each of resulting values according to the above multiplication becomes smaller or equal to the (n+1)th calculation value, as an (n+1)th decimal place number of the square root.

The calculation unit 63 calculates the square root of the input datum by combining the integer selected by the integer calculation unit 61 and each of the decimal place numbers chosen by the calculation unit 63.

Figure 7:
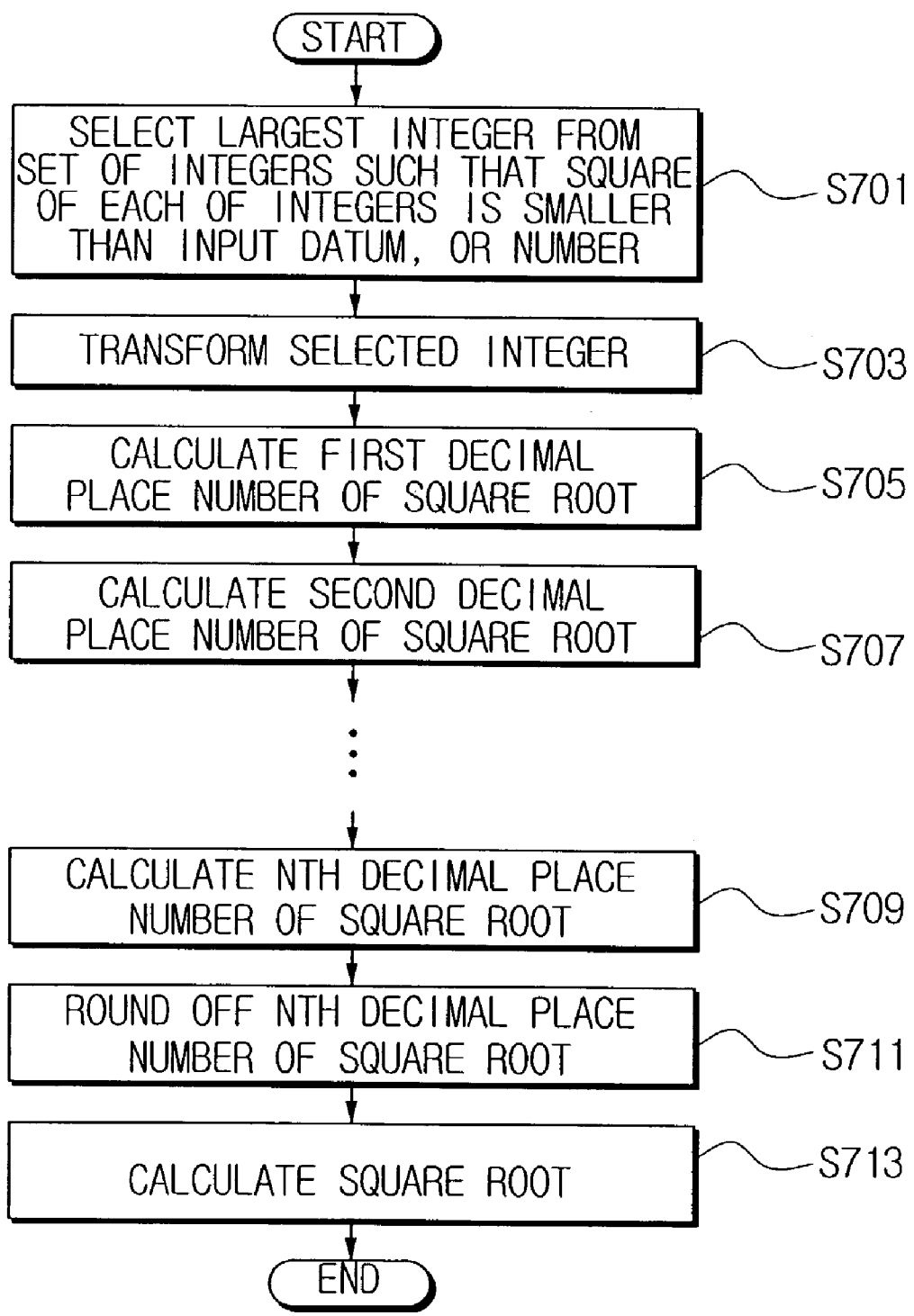
FIG. 7 is a flow chart illustrating the step of calculating a square root of a denary number by the SQRT calculator in FIG. 6.

FIG. 7 is a flow chart illustrating the step of calculating a square root of a denary number by the SQRT calculator in FIG. 6. As shown in FIG. 7, the integer calculation unit 61 selects a largest integer from a set of integers such that a square of each of the integers is smaller than an input datum, or number (S701). Hereinafter, a description will be given with respect to an input datum of "2" for explanation purpose.

There is only "1" in a set of integers with a square of each of the integers smaller than the input datum 2. Thus, a largest integer from the set selected by the integer calculation unit 61 becomes "1". The transformation unit 65 transforms the selected integer to calculate the square root of the input number (S703). In detail, the transformation unit 65 transforms the selected integer "1" by the integer calculation unit 61, by multiplying it by 2, so the transformed value becomes "2". The transformation unit 65, then, shifts a decimal point of the transformed value to the right by 1 place, whereby the resulting number becomes "20". The transformation unit 65 adds a certain number less than 10, which is a first lowest place value denoted by X, to the decimal point shifted number and the resulting number becomes a first transformation value which is "2X" here.

The calculation unit 63 subtracts the square of the integer selected by the integer selection unit 61, from the input number to calculate a first calculation value. The calculation unit 63 shifts a decimal point of the first lowest place value to the left by 2 places and multiplies the first transformation value by the resulting value. The calculation unit 63 chooses a largest number from a set of first lowest place values such that each of resulting values according to above multiplication becomes smaller or equal to the first calculation value, as a first decimal place number of the square root (S705). As a result, the first calculation value becomes "1" and the resulting value by shifting the decimal point of the first lowest place value to the left by 2 places becomes "0.0X". The largest number X such that the multiplication of the first transformation value 2X and 0.0X becomes smaller or equal to "1" is "4" therefore "4" is chosen as a first decimal place number of the square root by the calculation unit 63.

The transformation unit 65, on the other hand, adds the first transformation value "24" and first lowest place value "4" and shifts a decimal point of the added number "28" to the right by 1 place, thus the decimal point shifted number becomes "280". The transformation unit 65 adds a certain number less than 10, which is a second lowest place value denoted by "Y", to the decimal point shifted number "280" and the resulting number becomes a second transformation value "28Y".

The calculation unit 63 shifts a decimal point of the first lowest place value to the left by 2 places, which becomes "0.04" and subtracts the multiplication of the resulting value "0.04" and first transformation value "24", which is "0.96", from the first calculation value "1" to become a second calculation value "0.04".

The calculation unit 63 shifts a decimal point of the second lowest place value "Y" to the left by 4 places, which becomes "0.000Y", and multiplies the second transformation value "28Y" by the resulting value "0.000Y". The calculation unit 63 chooses a largest number from a set of second lowest place values such that each of the resulting values according to the above multiplication becomes smaller or equal to the second calculation value, as a second decimal place number of the square root (S707). The largest number Y, here, is "1" therefore "1" is chose as a second decimal place number of the square root.

In the same way, nth and (n+1)th decimal place numbers of the square root can be calculated. Namely, the transformation unit 65 adds an nth transformation value and an nth lowest place value, and shifts a decimal point of the added number to the right by 1 place. The transformation unit 65 adds a certain number less than 10, which is an (n+1)th lowest place value, to the decimal point shifted number and the resulting number becomes an (n+1)th transformation value (here, n=2, 3, 4 . . . ).

The calculation unit 63 shifts a decimal point of the nth lowest place value to the left by 2n places and subtracts the multiplication of the resulting value and nth transformation value from an nth calculation value, to calculate an (n+1)th calculation value. The calculation unit 63 shifts a decimal point of the (n+1)th lowest place value to the left by 2(n+1) places and multiplies the (n+1)th transformation value by the resulting value. The calculation unit 63 chooses a largest number from a set of (n+1)th lowest place values such that each of the resulting values according to the above multiplication becomes smaller or equal to the (n+1)th calculation value, as an (n+1)th decimal place number of the square root (S709). The calculation unit 63 may be implemented in a way that the calculation of the square root is terminated at a predetermined mth iteration and the square root is calculated by rounding off an mth decimal place number of the square root (S711).

The calculation unit 63 calculates the square root of the input datum by combining the integer selected by the integer calculation unit 61 and each of the decimal place numbers chosen by the calculation unit 63 (S713).

Figure 8:
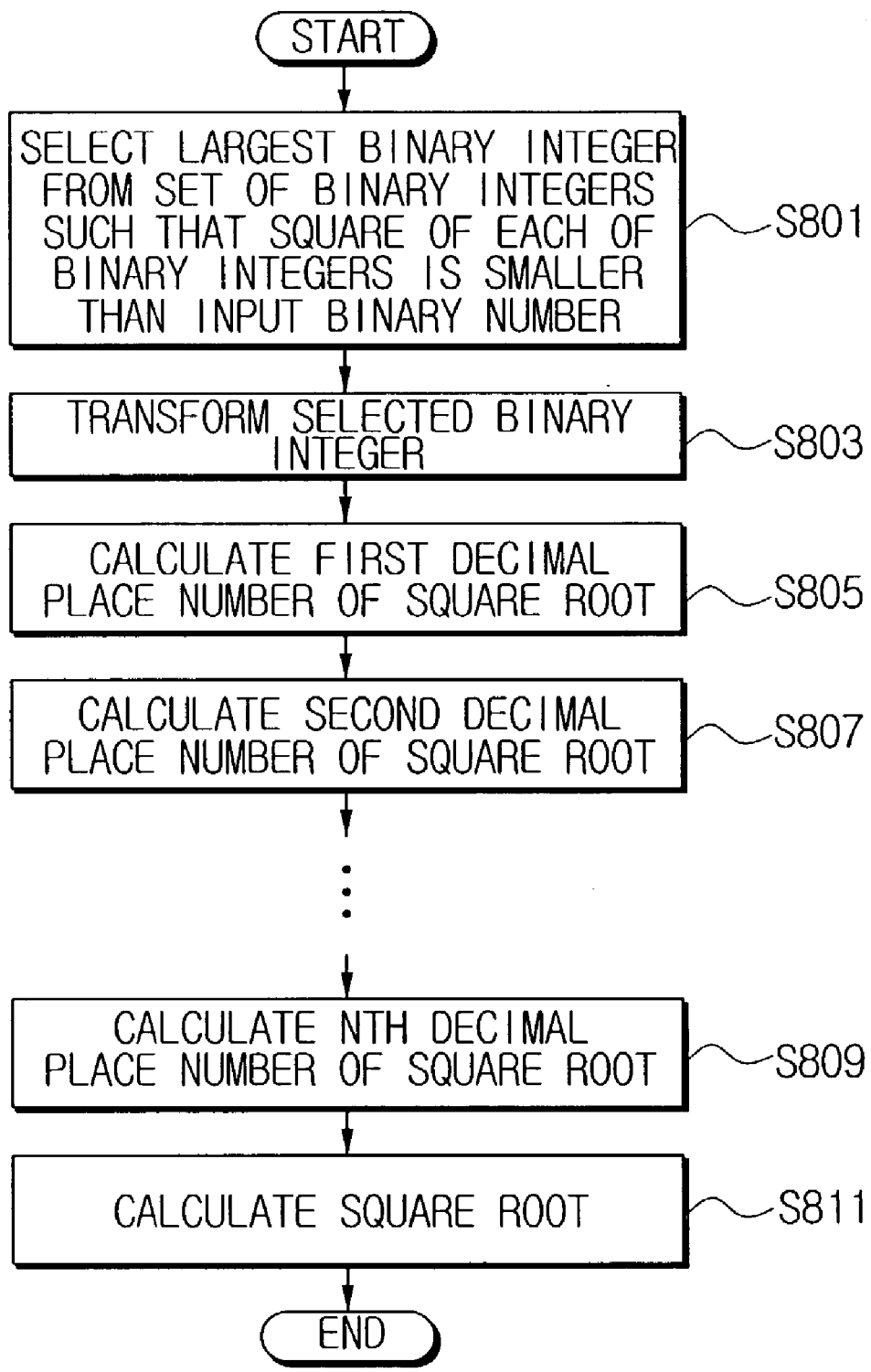
FIG. 8 is a flow chart illustrating the step of calculating a square root of a binary number by the SQRT calculator in FIG. 6.

FIG. 8 is a flow chart illustrating the step of calculating a square root of a binary number by the SQRT calculator in FIG. 6. As shown in FIG. 8, the integer calculation unit 61 selects a largest binary integer from a set of binary integers such that a square of each of the binary integers is smaller than an input binary datum, or binary number (S801). Hereinafter, a description will be given with respect to an input binary datum of "$10_{(2)}$" for explanation purpose.

There is only "$1_{(2)}$" in a set of binary integers with a square of each of the binary integers smaller than the input binary datum "$10_{(2)}$". Thus, a largest binary integer from the set selected by the integer calculation unit 61 becomes "$1_{(2)}$". The transformation unit 65 transforms the selected binary integer to calculate the square root of the input binary number (S803). In detail, the transformation unit 65 transforms the selected integer "$1_{(2)}$" by the integer calculation unit 61, by multiplying it by "$10_{(2)}$" so the transformed value becomes "$10_{(2)}$". The transformation unit 65, then, shifts a decimal point of the transformed value "$10_{(2)}$" to the right by 1 place, wherein the resulting number becomes "$100_{(2)}$" and then adds a certain number less than "$10_{(2)}$" which is a first lowest place value denoted by X, to the decimal point shifted number and the resulting number becomes a first transformation value which is "$10X_{(2)}$" here.

There is only "0" for X such that a subtraction of a multiplication of a shifted value, which is a result of shifting a decimal point of the first lowest place value to the left by 2 places, and the first transformation value "$10X_{(2)}$" from the input datum "$10_{(2)}$" is larger than the multiplication of the shifted value and the first transformed value. Thus, the calculation unit 63 chooses "0" as a first decimal place number of the square root (S805). Here, the first transformation value is "$100_{(2)}$" and a first calculation value is also "$100_{(2)}$".

The calculation unit 63 combines the binary integer "$1_{(2)}$" from the integer calculation unit 61 and the first decimal place number "0" from the transformation unit 65 to calculate the square root. Thus, the square root calculated up to the first decimal place is "$10_{(2)}$".

The transformation unit 65, on the other hand, adds the first transformation value "$100_{(2)}$" and first lowest place value "0" and shifts a decimal point of the added number "$100_{(2)}$" to the right by 1 place, thus the decimal point shifted number becomes "$1000_{(2)}$". The transformation unit 65 adds a certain number less than 10, which is a second lowest place value denoted by "Y" to the decimal point shifted number "$1000_{(2)}$" and the resulting number becomes a second transformation value "$100Y_{(2)}$". The transformation unit 65 chooses a largest Y such that a multiplication of a shifted value, which is a result of shifting a decimal point of the second lowest place value to the left by 4 places, and the second transformation value "$100Y_{(2)}$" is smaller or equal to the first calculation value "$100_{(2)}$". The largest number Y, here, is "1" therefore "1" is chose as a second decimal place number of the square root (S807). Thus, the square root calculated up to the second decimal place is "$1.01_{(2)}$".

An nth decimal place number of the square root can be calculated the same way as described above. The calculation unit 63 calculates the square root of the input binary datum by combining the binary integer selected by the integer calculation unit 61 and each of the decimal place numbers, up to nth decimal places, chosen by the calculation unit 63 (S811).

Figure 9:
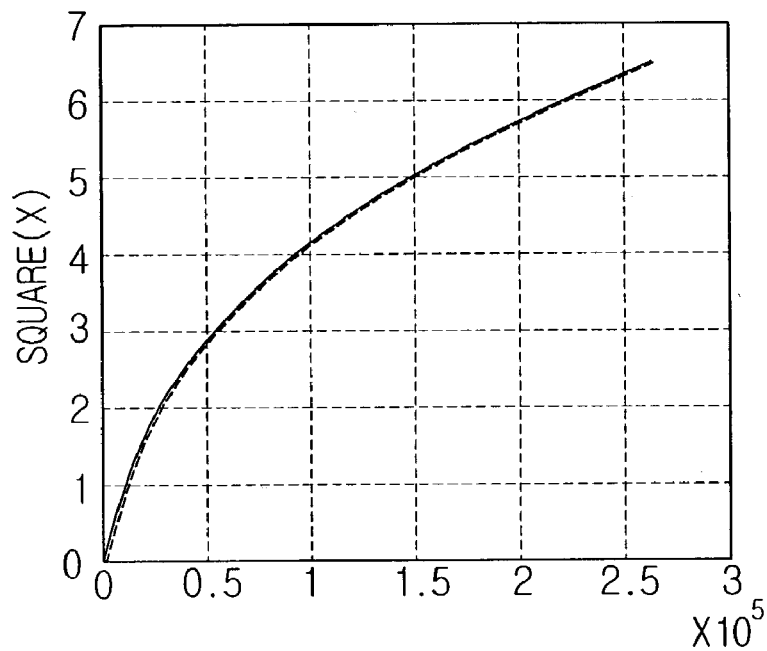
FIG. 9 is a graph showing relations between exact square roots and square roots calculated by the calculator in FIG. 6.
Figure 10:
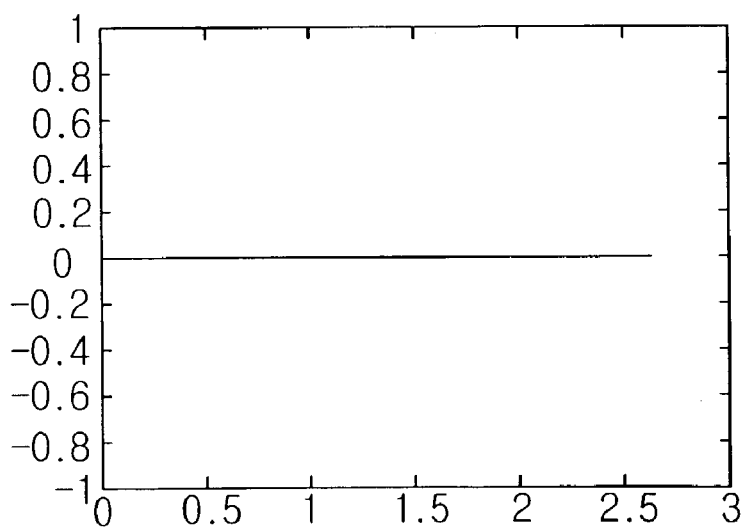
FIG. 10 is a graph showing differences between exact square roots and square roots calculated by the calculator in FIG. 6.

FIG. 9 is a graph showing relations between exact square roots and square roots calculated by the calculator in FIG. 6, and FIG. 10 is a graph showing differences between exact square roots and square roots calculated by the calculator in FIG. 6.

When calculations of binary square roots of all inputs are performed by the SQRT calculator in accordance with the present invention with an input of 18-bit and an output of 16-bit (integer place portion of 9-bit and decimal place portion of 7-bit) implemented, there has been no error caused. This shows that the SQRT calculator in accordance with the present invention has a great advantage in terms of an error rate. Furthermore, the SQRT calculator in accordance with the present invention needs only a small number of elements for the calculation unit, thereby enabling a small volume of hardware thereof.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A SQRT calculator for calculating a square root of an input datum comprising:

an integer calculation means for selecting a largest integer from a set of integers with a square of each of the integers smaller than the input datum;

a transformation means for adding an nth (n being an integer) transformation value of a certain number less than 10 and an nth lowest place value, shifting a decimal point of the added number to the right by 1 place, and adding an (n+1)th lowest place value of a certain number less than 10, to the decimal point shifted number to calculate an (n+1)th transformation value; and a calculation means for shifting a decimal point of the nth lowest place value to the left by 2n places, multiplying the shifted value by the nth transformation value, choosing a largest number from a set of nth lowest place values such that each of resulting values according to the multiplication becomes smaller or equal to an nth calculation value, as an (n+1)th decimal place number of the square root and a subtraction of the resulting value of the multiplication from the nth calculation value as an (n+1)th calculation value, wherein the transformation means transforms the selected integer from the integer calculation means by multiplying the selected integer by 2, shifting a decimal point of the resulting number to the right by 1 place, and adding the first lowest place value with n equal to 1 to the decimal point shifted number to calculate the first transformation value, wherein the calculation means shifts a decimal point of the first lowest place value to the left by 2 places, multiplies the first transformation value by the decimal point shifted value, and subtracts the resulting value from the input datum to calculate the first calculation value with n equal to 1.

2. The SQRT calculator according to claim 1, wherein n is increased by 1 upon an nth decimal place number of the square root being calculated.

3. The SQRT calculator according to claim 2, wherein the nth decimal place number of the square root is rounded off upon n reaching a predetermined number.

4. A SQRT calculator for calculating a square root of an input datum of a binary number comprising:

an integer calculation means for selecting a largest binary integer from a set of binary integers with a square of each of the binary integers smaller than the input binary datum;

a transformation means for adding an nth (n being an denary integer) transformation value of a certain number less than $10_{(2)}$, and an nth lowest place value, shifting a decimal point of the added number to the right by 1 place, and adding an (n+1)th lowest place value of a certain number less than $10_{(2)}$ to the decimal point shifted number, to calculate an (n+1)th transformation value; and a calculation means for shifting a decimal point of the nth lowest place value to the left by 2n places, multiplying the shifted value by the nth transformation value, choosing a largest number from a set of nth lowest place values such that each of resulting values according to the multiplication becomes smaller or equal to an nth calculation value, as an (n+1)th decimal place number of the square root and a subtraction of the resulting value of the multiplication from the nth calculation value as an (n+1)th calculation value, wherein the transformation means transforms the selected binary integer from the integer calculation means by multiplying it by $10_{(2)}$, shifting a decimal point of the resulting number to the right by 1 place, and adding the first lowest place value with n equal to 1 to the decimal point shifted number to calculate the first transformation value, wherein the calculation means shifts a decimal point of the first lowest place value to the left by 2 places to multiply the first transformation value by the decimal point shifted value, thereby subtracting the resulting value from the input binary datum to calculate the first calculation value with n equal to 1.

5. The SQRT calculator according to claim 4, wherein n is increased by 1 upon an nth decimal place number of the square root being calculated.

6. The SQRT calculator according to claim 5, wherein the nth decimal place number of the square root is rounded off upon n reaching a predetermined number.

* * * * *